United States Patent
Mazumder

(10) Patent No.: US 11,594,978 B2
(45) Date of Patent: Feb. 28, 2023

(54) SOLID-STATE POWER-CONVERSION SYSTEM

(71) Applicant: Sudip K. Mazumder, Hoffman Estates, IL (US)

(72) Inventor: Sudip K. Mazumder, Hoffman Estates, IL (US)

(73) Assignee: NEXTWATT LLC, Hoffman Estates, IL (US)

( * ) Notice: Subject to any disclaimer, the term of this patent is extended or adjusted under 35 U.S.C. 154(b) by 264 days.

(21) Appl. No.: 17/134,178

(22) Filed: Dec. 25, 2020

(65) Prior Publication Data

US 2021/0226550 A1 Jul. 22, 2021

Related U.S. Application Data

(60) Provisional application No. 62/953,465, filed on Dec. 24, 2019.

(51) Int. Cl.
| | |
|---|---|
| *H02M 5/22* | (2006.01) |
| *H02M 1/00* | (2006.01) |
| *H02M 5/293* | (2006.01) |
| *H02M 5/10* | (2006.01) |

(52) U.S. Cl.
CPC ........ *H02M 5/225* (2013.01); *H02M 1/0058* (2021.05); *H02M 1/0064* (2021.05); *H02M 1/0074* (2021.05); *H02M 1/0077* (2021.05); *H02M 5/2932* (2021.05); *H02M 5/10* (2013.01); *H02M 5/293* (2013.01)

(58) Field of Classification Search
CPC ........ H02M 5/10; H02M 5/225; H02M 5/293; H02M 5/2932; H02M 1/0058; H02M 1/0064; H02M 1/0074; H02M 1/0077
See application file for complete search history.

(56) References Cited

U.S. PATENT DOCUMENTS

| | | |
|---|---|---|
| 2009/0196082 A1 | 8/2009 | Mazumder |
| 2012/0063184 A1 | 3/2012 | Mazumder |
| 2014/0211521 A1 | 7/2014 | Mazumder |
| 2014/0286065 A1* | 9/2014 | Rinaldi ................... H02M 1/10 363/124 |
| 2019/0222259 A1 | 7/2019 | Mazumder |
| 2019/0280586 A1 | 9/2019 | Chen |
| 2020/0136524 A1* | 4/2020 | Chen ........................ H02J 3/46 |
| 2020/0153354 A1* | 5/2020 | Ozeri ........................ H02J 3/00 |
| 2021/0067050 A1* | 3/2021 | Raju ....................... H02M 7/49 |
| 2021/0273574 A1* | 9/2021 | Zheng ............... H02M 3/33584 |

OTHER PUBLICATIONS

International Search Report and Written Opinion for App. No. PCT/US2020/067047, dated Mar. 19, 2021, 18 pages.

* cited by examiner

*Primary Examiner* — Jue Zhang
(74) *Attorney, Agent, or Firm* — Loeb & Loeb LLP

(57) ABSTRACT

Aspects of the invention overcome a monolithic approach to conventional low-frequency LPTs by using a high-frequency solid-state alternating current ac/ac modular power-conversion approach. Embodiments of the invention enable the ability to incorporate new technologies without in all cases redoing a LPT design from scratch. Furthermore, given that LPTs are for the long term, aspects of the invention ensure that they are durable, efficient, and fault tolerant with overloading capability.

20 Claims, 19 Drawing Sheets

PRIOR ART

FIG. 2

| Voltage Rating (Primary-Secondary) | Capability MVA Rating | Approximate Price ($) | Approximate Weight & Dimensions |
|---|---|---|---|
| Transmission Transformer | | | |
| *Three Phase* | | | |
| 230-115kV | 300 | $2,000,000 | 170 tons (340,000 lb) |
| 345-138kV | 500 | $4,000,000 | 335 tons (670,000 lb) |
| 765-138kV | 750 | $7,500,000 | 410 tons (820,000 lb) |
| *Single Phase* | | | |
| 765-345kV | 500 | $4,500,000 | 235 tons (470,000 lb) |
| Generator Step-Up Transformer | | | |
| *Three Phase* | | | |
| 115-13.8kV | 75 | $1,000,000 | 110 tons (220,000 lb) |
| 345-13.8kV | 300 | $2,500,000 | 185 tons (370,000 lb) |
| *Single Phase* | | | |
| 345-22kV | 300 | $3,000,000 | 225 tons (450,000 lb) |
| 765-26kV | 500 | $5,000,000 | 325 tons (650,000 lb) |

PRIOR ART

PRIOR ART

PRIOR ART

SOLID-STATE POWER-CONVERSION SYSTEM

CROSS REFERENCE TO RELATED APPLICATION

This is a nonprovisional application that claims priority to U.S. provisional patent application Ser. No. 62/953,465, filed on Dec. 24, 2019, whose disclosure is incorporated by reference it its entirety herein.

BACKGROUND

In general, a large-power-transformer (LPT) system is a conventional approach and is illustrated in FIG. 1 as a prior art, such as evidenced by a June 2020 publication of "Large power transformers and the U.S. Electric Grid" by the Office of Electricity Delivery and Energy Reliability of U.S. Department of Energy ("June 2012 Publication"). As illustrated in FIG. 1, individual parts are not interchangeable with each other and their high costs (at reduced unit volume) prohibit extensive spare inventories of parts. For example, bushings, oil conservators, radiators and fans, windings and cores and tanks are discrete parts. As such, on average, only a limited amount of PTs are manufactured for individual designs. This is because if a change or modification is needed, the conventional LPT could not be modified easily and modification may need to wait for a while before the update, modification or replacement is installed. This prior approach poses a further challenge since given that the several existing LPTs are reaching their end of service lives. For example, the average age of installed LPTs in the United States is well over few decades, with multiple LPTs estimated to be 25 years or older. In addition, the loss of plurality of such LPTs, that form the backbone of U.S. power grid, will clearly run into the problem of energy security related to the non-availability of sufficient spares exacerbated further by the fact that these spares are not interchangeable for installations at different locations. Also, typical voltage ratings of conventional LPT may be illustrated in the following table:

TABLE 1

Typical voltage ratings of conventional LPT.

| | | | | Low Side | | | | |
|---|---|---|---|---|---|---|---|---|
| High Side | 345 kV | 230 kV | 161 kV | 138 kV | 115 kV | 69 kV | 35 kV | 4 kV |
| 765 kV | 9 | 1 | 1 | 14 | 3 | 7 | 1 | 15 |
| 500 kV | 3 | 107 | 16 | 43 | 69 | 43 | 3 | 153 |
| 345 kV | — | 18 | 27 | 269 | 185 | 136 | 10 | 336 |
| 230 kV | — | — | 87 | 226 | 628 | 422 | 56 | 528 |
| 161 kV | — | — | — | 44 | 162 | 336 | 14 | 158 |
| 138 kV | — | — | — | — | 365 | 1129 | 35 | 476 |
| 115 kV | — | — | — | — | — | 390 | 213 | 337 |

Furthermore, procurement and manufacturing of LPTs is a complex process that requires prequalification of manufacturers, a competitive bidding process, the purchase of raw materials, and special modes of transportation due to its size and weight. The result is the possibility of extended lead times that may stretch beyond 20 months if the manufacturer has difficulty obtaining certain key parts or materials. Key industry sources—including the Energy Sector Specific Plan, the National Infrastructure Advisory Council's "Framework for Establishing Critical Infrastructure Resilience Goals and the North American Electric Reliability Corporation's Critical Infrastructure Strategic Roadmap have identified the limited availability of spare LPTs as a potential issue for critical infrastructure resilience in the United States, and both the public and private sectors have been undertaking a variety of efforts to address this concern. See also June 2012 Publication.

Due to the significant capital expenditure, long lead time, and unique specifications associated with the procurement and manufacturing of a replacement LPT, there is an opportunity to research more flexible and adaptable LPT designs. Although the costs and pricing vary by manufacturer and by size, a LPT may cost millions of dollars and weigh around hundreds of tons. FIG. 2 illustrates a table showing a typical overview of the cost and weights of major parts of the LPT, which is supported by the June 2012 Publication.

Two raw materials—copper and electrical steel—often account for over half the total cost of an LPT, see also June 2012 Publication. For example, manufacturers have estimated that the cost of raw materials accounted for 57 to 67 percent of the total cost of LPTs sold in the United States between 2008 and 2010. Of the total material cost, about 18 to 27 percent was for copper and 22 to 24 percent was for electrical steel. The average prices of both copper and steel have increased significantly over the years, as shown in FIG. 3, which have clear implications for conventional LPTs and supported by the June 2012 Publication. Electrical steel is used for the core of a power transformer and is critical to the efficiency and performance of the equipment. In addition, copper is used for the windings. In recent years, the price volatility of these two commodities in the global market has affected the manufacturing conditions and procurement strategy for LPTs.

Transportation is also an important element of the total LPT cost, because an LPT may weigh hundreds of tons and often requires long-distance transport. Transporting an LPT is a massive challenge with transporting conventional bulky and heavy low frequency (LF) (60-Hz as well as 50 Hz) LPTs. These items have large dimensions and heavy weight pose unique requirements to ensure safe and efficient transportation. Current road, rail, and port conditions are such that transportation is taking more time and becoming more expensive.

Therefore, an improved approach is required as conventional low-frequency LPTs typically follow a monolithic approach to design due to historical reasons that need to transition to more modular and flexible (e.g., in voltage, current, power flow) designs with ability to seamlessly/near-seamlessly scale. Given that the cost of raw materials has continued to increase, existing LPTs are high in transportability and transportation cost.

SUMMARY

Aspects of the invention overcome a monolithic approach to conventional low-frequency LPTs by using a high-frequency solid-state alternating current ac/ac modular power-conversion approach. Embodiments of the invention enable the ability to incorporate new technologies without in all cases redoing a LPT design from scratch. Furthermore, given that LPTs are for the long term, aspects of the invention ensure that they are durable, efficient, and fault tolerant with overloading capability.

BRIEF DESCRIPTION OF THE DRAWINGS

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted to facilitate a less obstructed view of these various embodiments of the present disclosure. It may be further appreciated that certain actions and/or steps may be described or depicted in a particular order of occurrence while those skilled in the art may understand that such specificity with respect to sequence is not actually required. It may also be understood that the terms and expressions used herein may be defined with respect to their corresponding respective areas of inquiry and study except where specific meanings have otherwise been set forth herein.

FIG. 2 illustrates a table showing a typical overview of the cost and weights of major parts of the LPT.

DETAILED DESCRIPTION

Embodiments may now be described more fully with reference to the accompanying drawings, which form a part hereof, and which show, by way of illustration, specific exemplary embodiments which may be practiced. These illustrations and exemplary embodiments may be presented with the understanding that the present disclosure is an exemplification of the principles of one or more embodiments and may not be intended to limit any one of the embodiments illustrated. Embodiments may be embodied in many different forms and should not be construed as limited to the embodiments set forth herein; rather, these embodiments are provided so that this disclosure may be thorough and complete, and may fully convey the scope of embodiments to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

High-Frequency Solid-State Power-Conversion System

Figure 1:
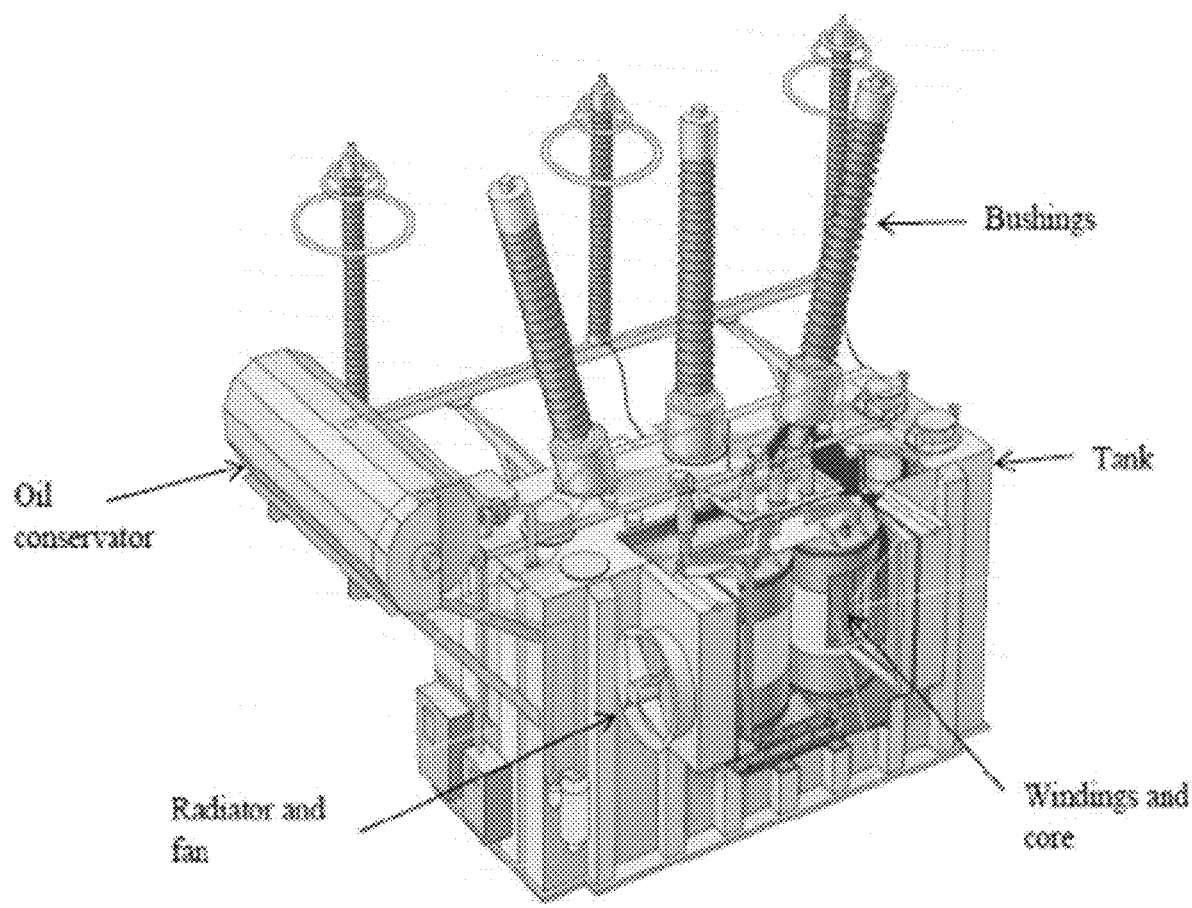
FIG. 1 is an illustration of a large-power-transformer (LPT) system of the prior art.
Figure 3:
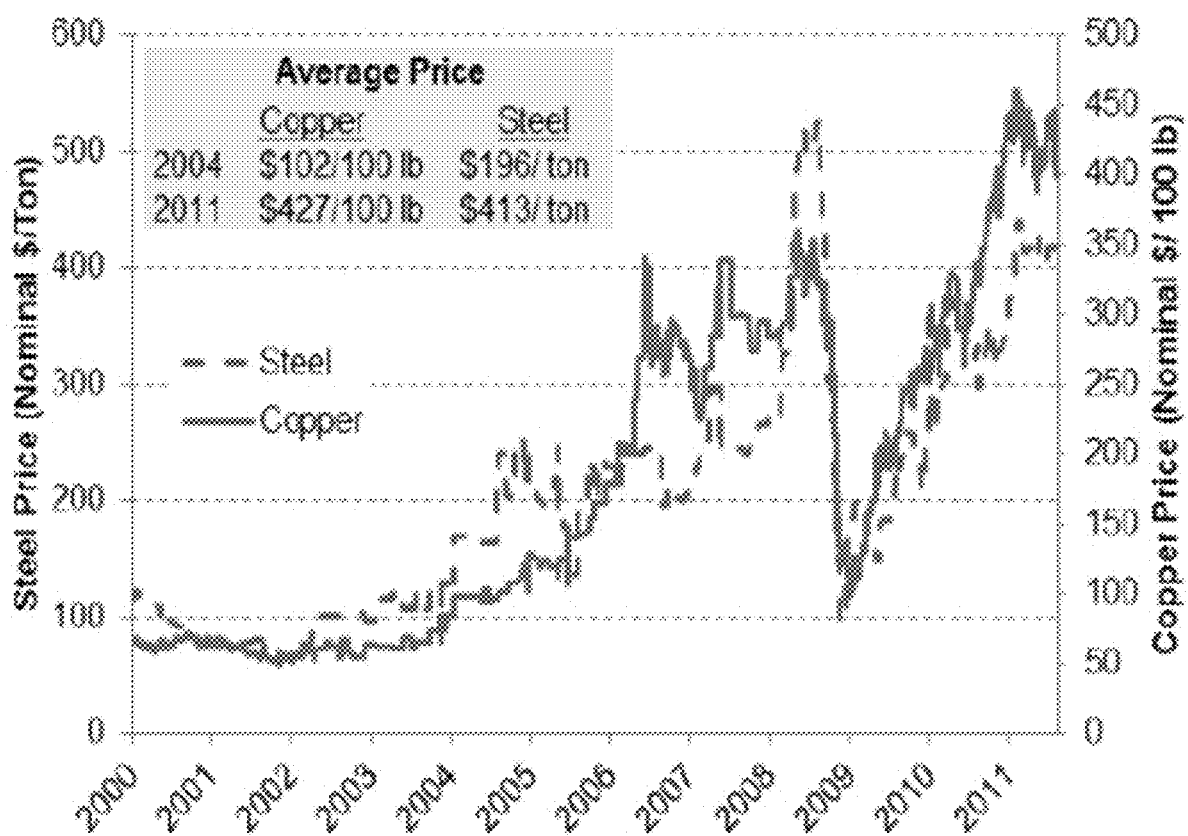
FIG. 3 illustrates a chart showing average prices of both copper and steel have increased significantly over the years.
Figure 4A:
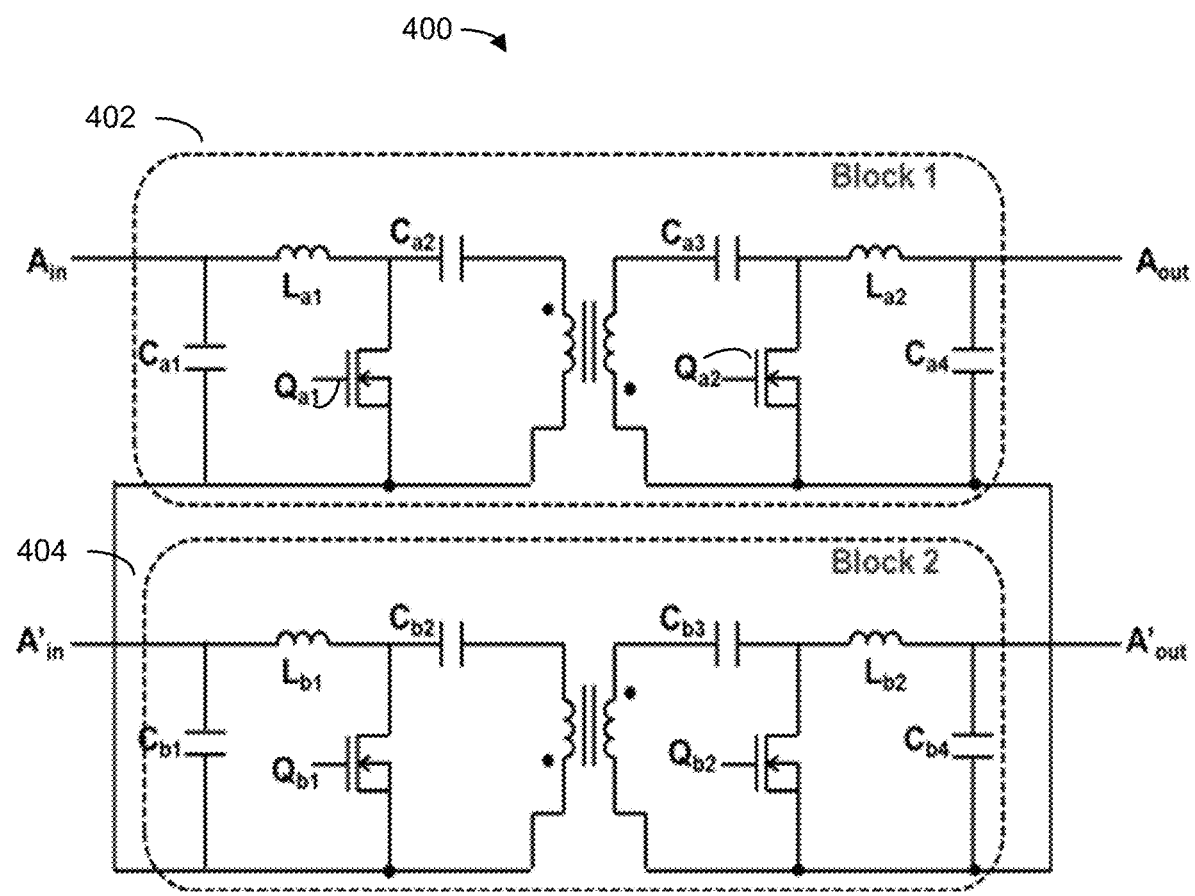
FIG. 4a illustrates a schematic of a single-phase system according to some embodiments.
Figure 4B:
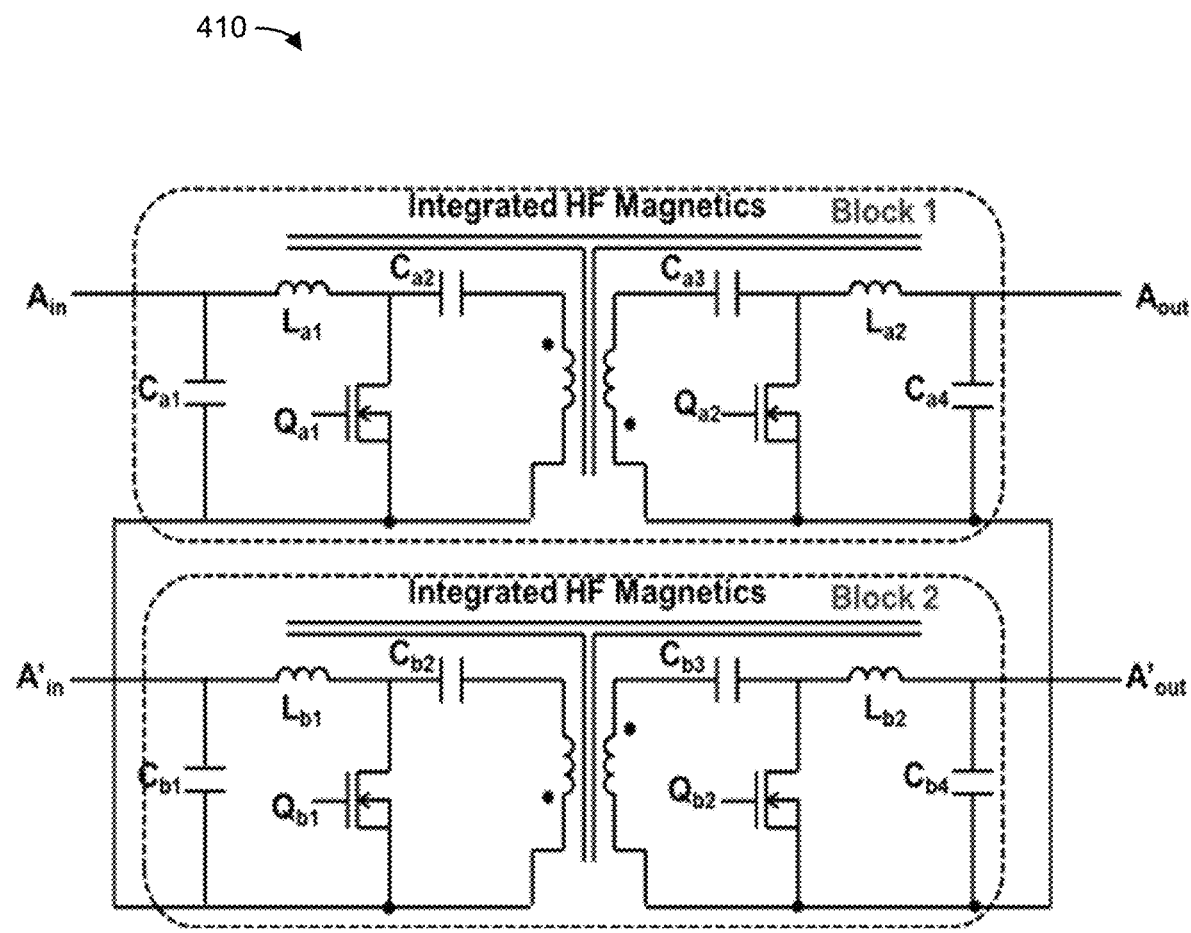
FIG. 4b illustrates a schematic of a single-phase system having inductors and transformer aspects of the invention.

Referring now to FIG. 4a, a single-phase module of the aspects of the invention is shown. In one embodiment, the single-phase module may provide a basic building-block to work with or without an isolated transformer. For example, magnets or magnetic force sources (e.g., electromagnets) may be provided as an external, separate or a discrete element. In another embodiment, the magnetic source illustration in FIG. 4b may be a magnetic core that includes the high frequency transformer, the capacitor, and the inductor as a single core. In some embodiments, they may be integrated as illustrated in FIG. 4b.

Still referring to FIG. 4a, the single-phase system 400 comprises two sets of blocks 402 and 404 for the single-phase realization that are connected in series at the input as well as at the output sides. In one embodiment, the input and the output may be both alternating current (ac) power signals that may have different magnitudes.

In one embodiment, in each block 402 or 404, when an input side switch (e.g., $Q_{a1}$) turns on, the fluxes of the input and output inductors (e.g., $L_{a1}$ or $L_{a2}$) are built up. On the other hand, if an output side switch (e.g., $Q_{a2}$) turns on, then, the energies of the inductors may be transferred to an ac-link capacitor (e.g., $C_{a2}$) and an output capacitor (e.g., $C_{a4}$). The frequency of the ac may also have different values for different needs.

For example, the American grid frequency is 60 Hz nominally, but it may vary a bit around that nominal frequency. Further, in another embodiment, Asian countries may be 50 Hz in places. However, in other applications, such as aerospace applications, the frequency may be 400 Hz.

The switching schemes of two devices, such as majority-carrier devices like field effect transistors and/or minority carrier devices. In this example, the switching in each block of the single-phase module 400 may be different. For instance, in one scheme, all of the four switches in the two blocks may be switching under high frequency. In another scheme, while the two switches of one block may be operating under high frequency, the two switches of the other block may be static in switching state. In yet another scheme, one may achieve a mixed combination of these two switching schemes. It is also noted that, while the ac/ac single-phase topology in FIG. 4a may be hard-switched for some switching states, soft-switching for additional loss mitigation is possible by using a combination of possibilities.

In one aspect, the magnetics may be magnetic-core based and/or may be air-core based. In another embodiment, even though the basic building blocks shown in FIG. 4a is a two-level embodiment, three or higher-level variants may also be included, as illustrated in one embodiment in FIG. 4c. Additionally, even though FIG. 4a may illustrate one embodiment that is based on an inductor and capacitor passive-based approach, a switched-capacitor approach solely relying on capacitors may also be a variant of the same architectural approach shown in FIG. 4a. This approach is shown in FIG. 4d. In this embodiment, aspects of the invention may be shown with a phase staggering. For example, in an isolated switched-capacitor approach, a switch may be used to switch to each ac/ac module in response to an appropriately time phase shifted to reduce the ripple and reducing magnetic passive size.

For the embodiment using the isolated transformer, the size of the high-frequency based transformer solution significantly reduces the size of the transformer obtained using a conventional low-frequency-transformer approach as used in conventional LPTs due to the rise in frequency may reduce flux cycle, which in turn reduces the core size. Switches $Q_{a1}$-$Q_{a4}$ are not limited to field-effect transistor (FETs), as illustrated. In one embodiment, the switches $Q_{a1}$-$Q_{a4}$ may be of different structures (e.g., insulated-gate bipolar transistor (IGBT), junction gate field-effect transistor (JFET), metal oxide silicon field-effect transistor (MOSFET), or bipolar junction transistor (BJT)) and may be of different material base (e.g., GaN, SiC, Si, GOx). In one aspect, the basic topology of a block in FIG. 4a may have variance, and the architectural input-series-output-series system is realizable using other lower- and higher-order power-converter topologies as well. For example, buck or boost basic or derived topologies such as Zeta or Sepic topology.

Figure 4C:
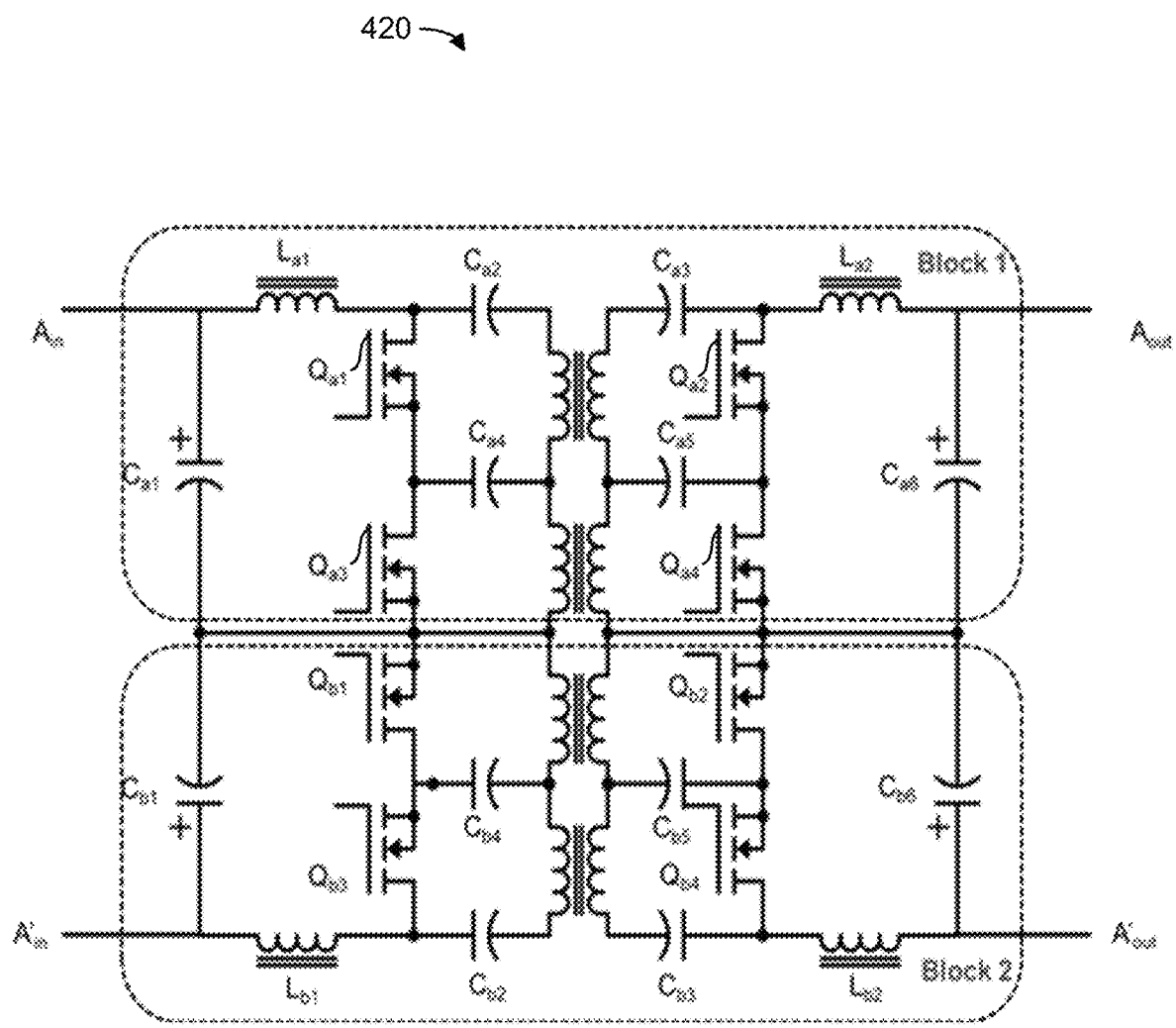
FIG. 4c illustrates a schematic of a two-level system aspects of the invention.
Figure 4D:
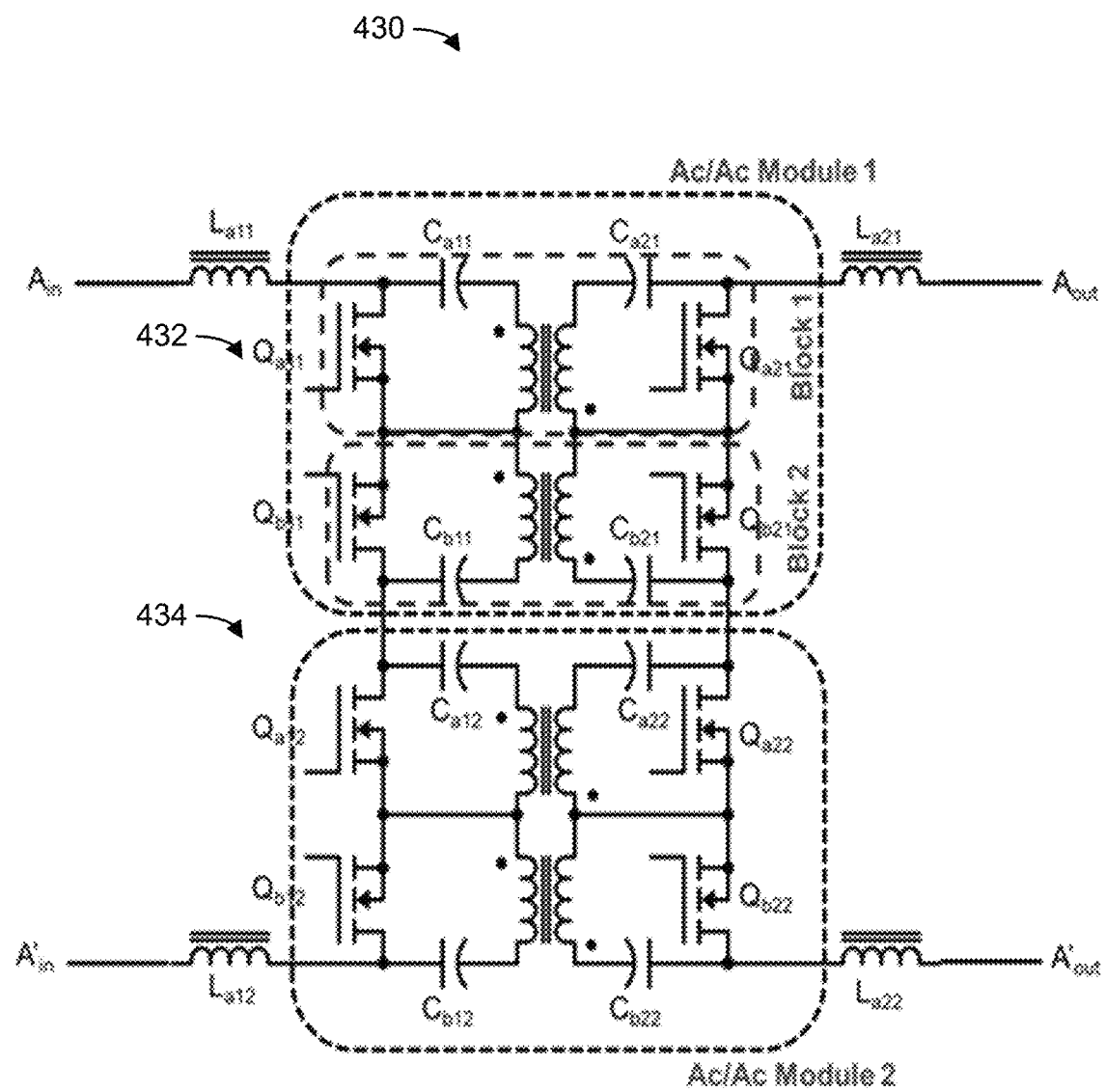
FIG. 4d illustrates a schematic of a switched-capacitor system aspects of the invention.
Figure 4E:
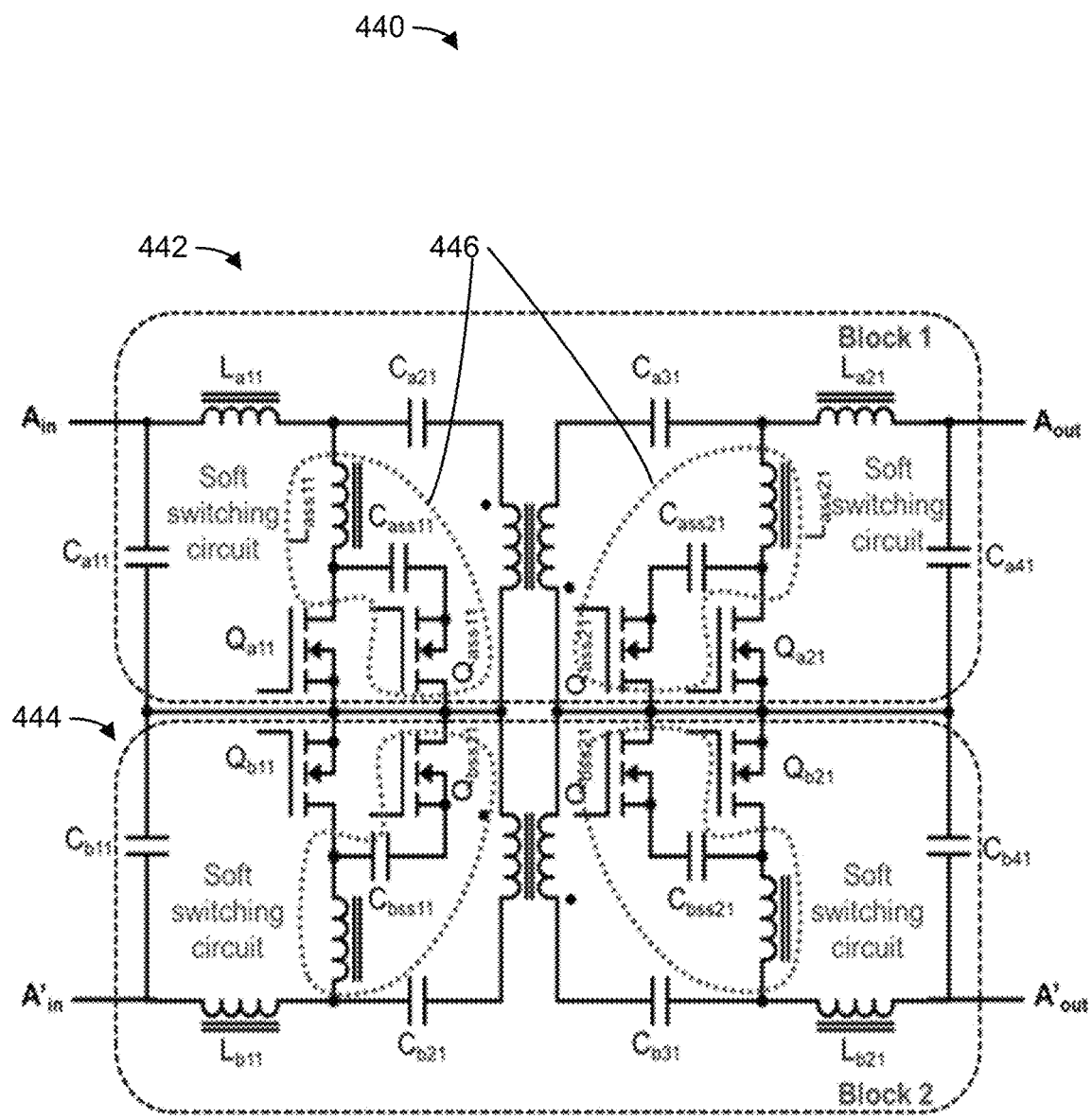
FIG. 4e illustrates a schematic of a soft-switching topology system aspects of the invention.

For instance, one embodiment of soft-switching topology is captured in FIG. 4e. In one embodiment, the soft-switching circuit may be used as a loss-mitigating soft switching circuit. In another scheme, instead of using an ac-link as a capacitor only, one may use an inductive-capacitive link instead of the capacitor. In one example, the inductive part of the link may be an external inductor and/or the parasitic inductance of the isolating transformer itself. The inductive link in another embodiment may be in series with a switch as well. In another embodiment, it may be also use resonant, quasi-resonant zero-voltage-switching, zero-current-switching, even zero-voltage-zero-current-switching auxiliary circuits that suitably embedded in the core topology shown in FIG. 4a.

Still referring to FIG. 4a, in one embodiment, a single-phase system may include a single-stage topological ac/ac illustration with bidirectional power-flow capability. In this aspect, ac input is fed between $A_{in}$ and $kin$ while ac output is sourced between $A_{out}$ and $A'_{out}$. In FIG. 4b, a variation system 410 of FIG. 4a may include inductors and transformer in each block monolithically integrated to reduce size and ripple.

Referring to FIG. 4c, another multilevel variant illustration 420 of the two-level block shown in FIGS. 4a and 4b. Referring to FIG. 4d, another Illustrative embodiment 430 of two ac/ac modules connected in a cascaded configuration. Unlike FIG. 4a, each ac/ac module may not comprise the inductors. Instead, the modules may be operated using interleaving (or phase staggered). For example, interleaving or phase staggering may include the switching of each ac/ac module is shifted Ts/N where Ts is the switching period and N is the number of ac/ac modules. With this approach, ripple may be reduced and that magnetics size may be reduced.

In one embodiment, the FIG. 4d may identify 2 modules, modules 432 and 434. the aspects of the invention may be extendable to multiple modules. The input and output inductors (e.g., $L_{a11}$ and $L_{a12}$ and $L_{a21}$ and $L_{a22}$, respectively) may be realized in plurality of configurations. For instance, they may be discrete or they may be coupled on the input and output sides or they may all be coupled. Depending on the application, only one inductor on the input and output side may suffice as well.

Referring now to FIG. 4e, another embodiment illustrates another configuration 440 for reducing semiconductor loss of the basic realization shown for instance in FIGS. 4a and 4b. The add-on soft-switching (SS) circuit 446 for each block (e.g., 442 and 444) of the overall ac/ac module 440 is illustrated. It is noted that, depending on the application, added capacitance may be needed across each of the two main devices (e.g., for $Q_{a11}$ and $Q_{a21}$) in each block 442 or 444 to enable SS. Also, the SS devices 446 in each block 442 or 444 (e.g., $Q_{ass12}$ and $Q_{ass21}$) may be other type of appropriate replacement, which may include bipolar and/or narrow-/wide-bandgap device (e.g., Si IGBT with antiparallel diode). Also, the SS circuit 446 may include inductors (e.g., $L_{ass11}$ and $L_{ass21}$) in each block 442 or 444 may be discrete or coupled or coupled to the transformer. In one embodiment, an auxiliary inductor for soft switching may be discrete (i.e., one on each core) or may be combined (coupled) onto a single core or 2 inductors may be coupled to the same core that also hosts the transformer. In a variant of FIG. 4e, these solid-state (SS) circuits 446 may be SS inductors and these may fully or partially absorbed (e.g., as a leakage inductance) in the transformer of the same block.

In one aspect of the invention, modular scalability of the basic ac/ac innovations is multifold. For example, modular scalability may apply to number of phases, voltage levels, and current levels. Regarding a multi-phase operation, the modular scalability may have different pathways, which are discussed below. One such example may include an example of the single-phase building system shown in FIG. 4a for N times for N-phase operation. In such an example, thus, for a three-phase operation (i.e., with N=3), a system 500 may include three of the single-phase modules (shown in FIGS. 4a through 4e) are needed. Alternately, N-phase system may also be realized using N blocks as illustrated in FIG. 5 for a three-phase system (i.e., with N=3), having blocks 502, 504, and 506.

Figure 5:
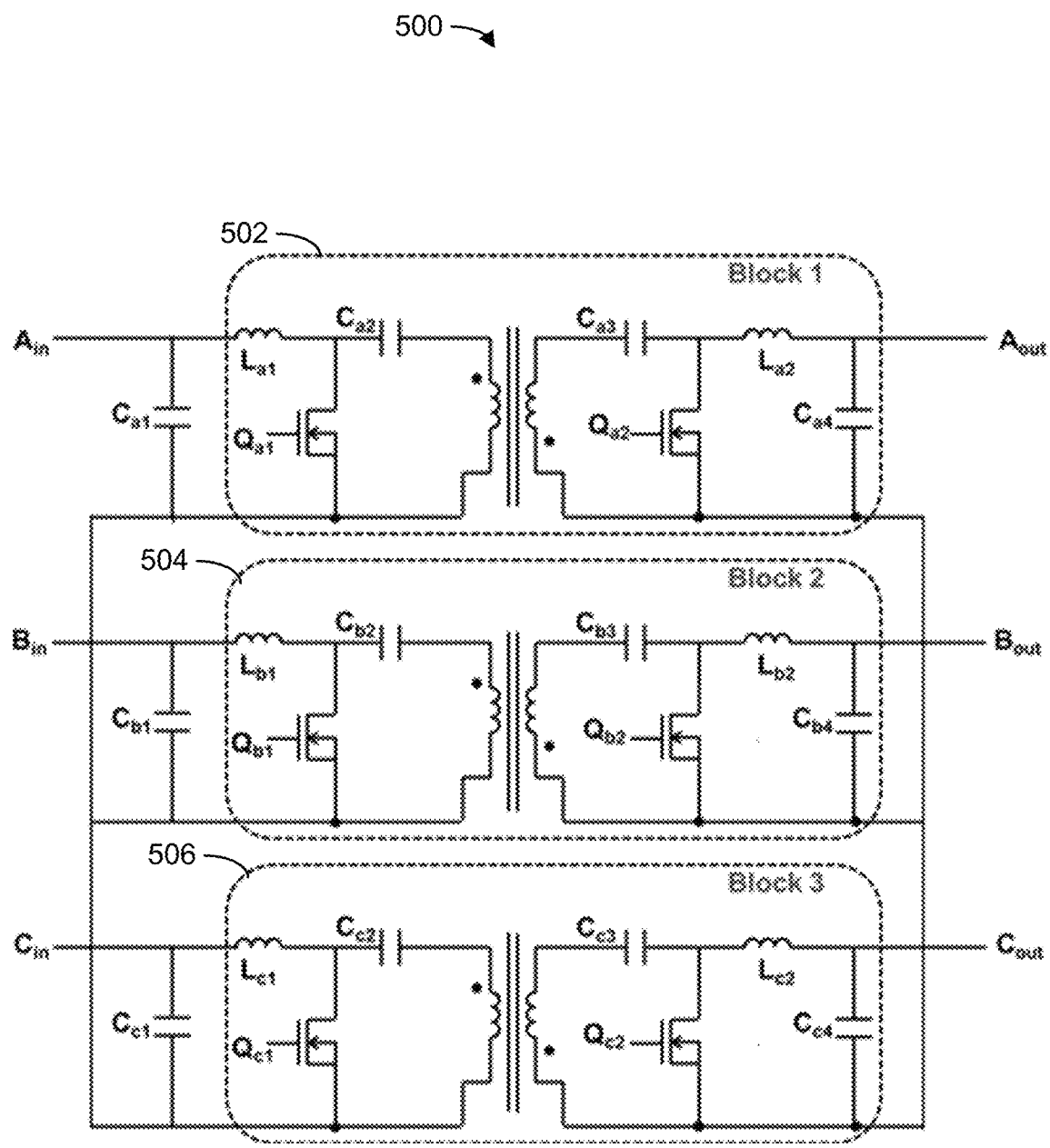
FIG. 5 illustrates a N-time replicated single-phase system for N-phase operation aspects of the invention, where N=3.

In one example, the three-phase design system shown in FIG. 5 may include 3 blocks with 2 switches per block. In this embodiment, the switches in each of the clocks may be switching under high frequency continuously OR they may be sometimes switching under high frequency followed by a time duration when they are not operating under high frequency and may not change switching state.

In another embodiment, the multi-phase scheme may build upon the switching scheme outlined for the single-phase system shown in FIG. 4a. For example, the multi-phase approach may be extended the same way with regard to all switches of the N blocks, thereby including the possibilities that for the N-phase system operation may be enabling all of the switches switching under high-frequency condition all the time. In another embodiment, some of the switches operating under high frequency while some of the switches not changing switching state, or an arbitrary combination of these two switching possibilities.

In one aspect of the invention, the single-phase system in FIG. 4a may also be able to handle loss mitigation. For example, mechanisms of loss mitigation using soft-switching for single-phase system variant shown in FIG. 4a may also be extendable to the N-phase scalable version as well. In another embodiment, even though the reference for multi-phase extension is so far referred to the topological variant in FIG. 4a, aspects of the invention may extend for topological extensions and/or variations of the basic ac/ac module, as detailed earlier with some illustrative embodiments provided in FIG. 4a.

In another embodiment, the system in FIG. 5 may also include aspects of the invention shown in FIGS. 4b, 4c, 4d, and 4e. In other words, the blocks in the system in FIG. 5 may incorporate the various features of FIGS. 4b, 4c, 4d, and 4e. In another embodiment, the incorporation may be selective; for example, the incorporation of the various embodiments may be individually or discretely incorporated.

Figure 6:
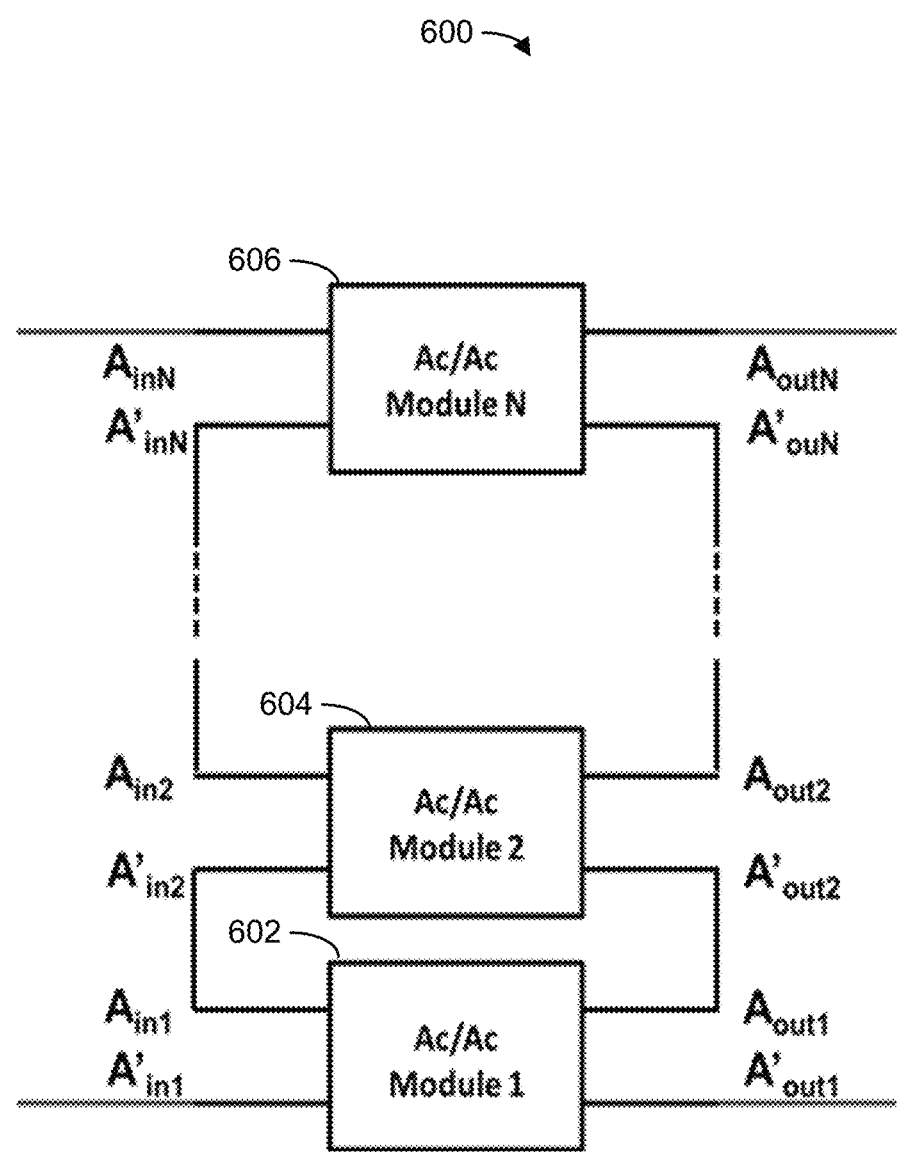
FIG. 6 illustrates a schematic for a single-phase voltage scaling pathway aspects of the invention.

With regard to voltage scalability, there are several pathways. One of the pathways may need to cascade the single-phase system shown in FIG. 4a as illustrated in FIG. 6. FIG. 6 may be a voltage scaling approach having a single-phase ac/ac system as the building block according to some embodiments.

In FIG. 6, a schematic illustrates a single-phase system 600 having ac/ac modules 602, 064, and 606 for the single-phase voltage scaling pathway. For example, each "ac/ac" block, such as 602, may be a single-phase system as illustrated for one embodiment in FIG. 4a. For example, the output of each ac/ac voltage may be added up for voltage scaling. In another embodiment, variant may be a single-phase ac/ac scaling is to follow a similar approach as the previous scheme with an exception that the inductors and capacitors (LC) filters at the input and output of each block may not be repeated for each ac/ac block in FIG. 6.

In another embodiment, the system in FIG. 6 may also include aspects of the invention shown in FIGS. 4b, 4c, 4d, and 4e. In other words, the blocks in the system in FIG. 6 may incorporate the various features of FIGS. 4b, 4c, 4d, and 4e. In another embodiment, the incorporation may be selective; for example, the incorporation of the various embodiments may be individually or discretely incorporated.

Figure 7A:
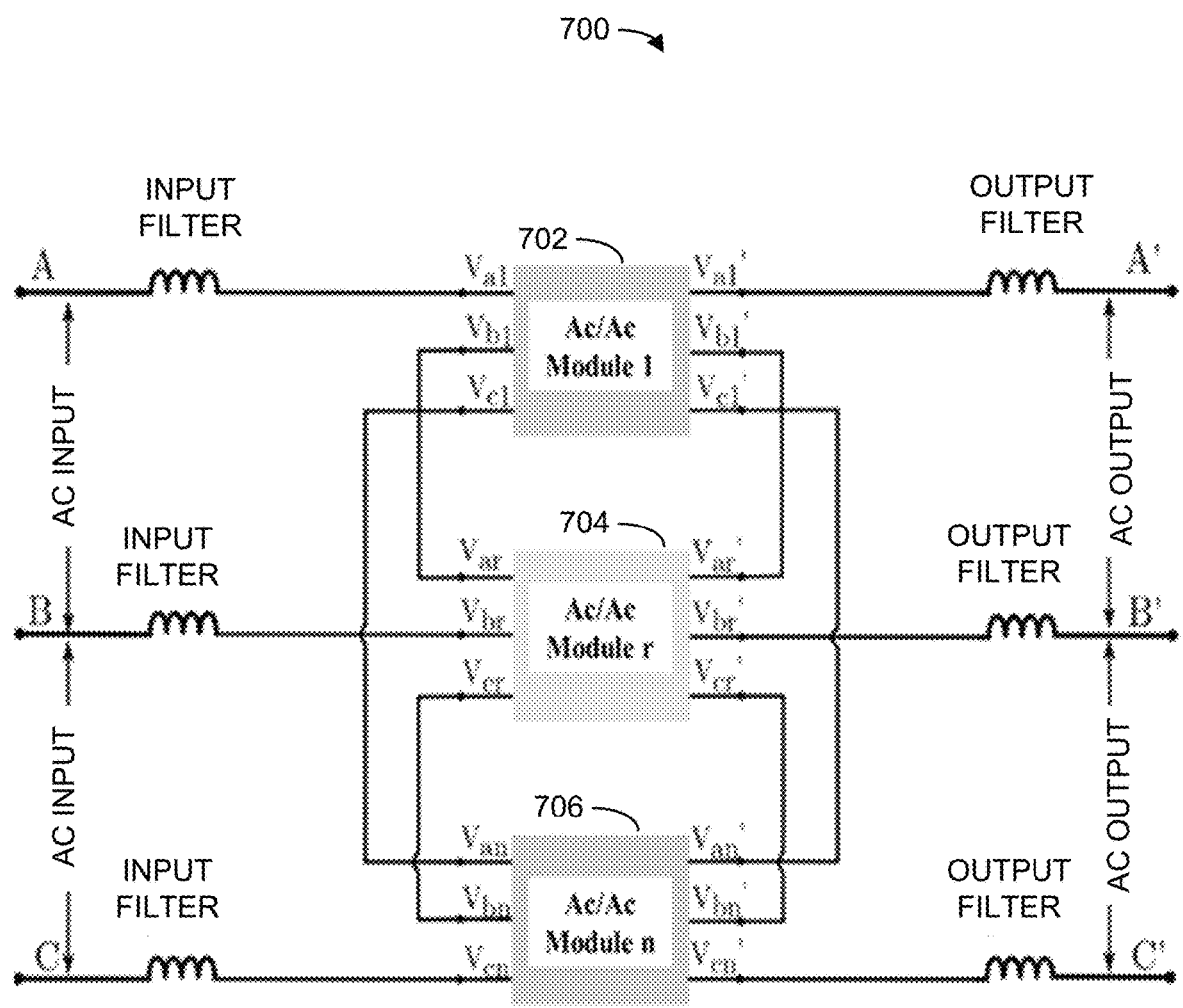
FIG. 7a illustrates a schematic for a voltage scaling system having a cascaded N-phase system according to some embodiments.

Instead, FIG. 7a illustrates a schematic showing a system 700 that builds on the system shown in FIG. 4a. In one example, the system 700 may include the LC filters at the input and output of the block and the input and output voltage of the reduced-order block is added in cascaded configuration and finally the LC filters are placed for the overall multilevel unit at the overall (or even intermediate) input and the overall output ports. Also, the cascaded single-phase ac/ac system may be replicated for N sets to realize an overall N-phase system. In another embodiment, the reference for multi-phase extension is so far referred to the topological variant in FIG. 4a. In one aspect, one embodiment may include topological extensions and/or variations of the basic ac/ac module, as detailed earlier with some illustrative embodiments provided in FIG. 6.

Figure 7B:
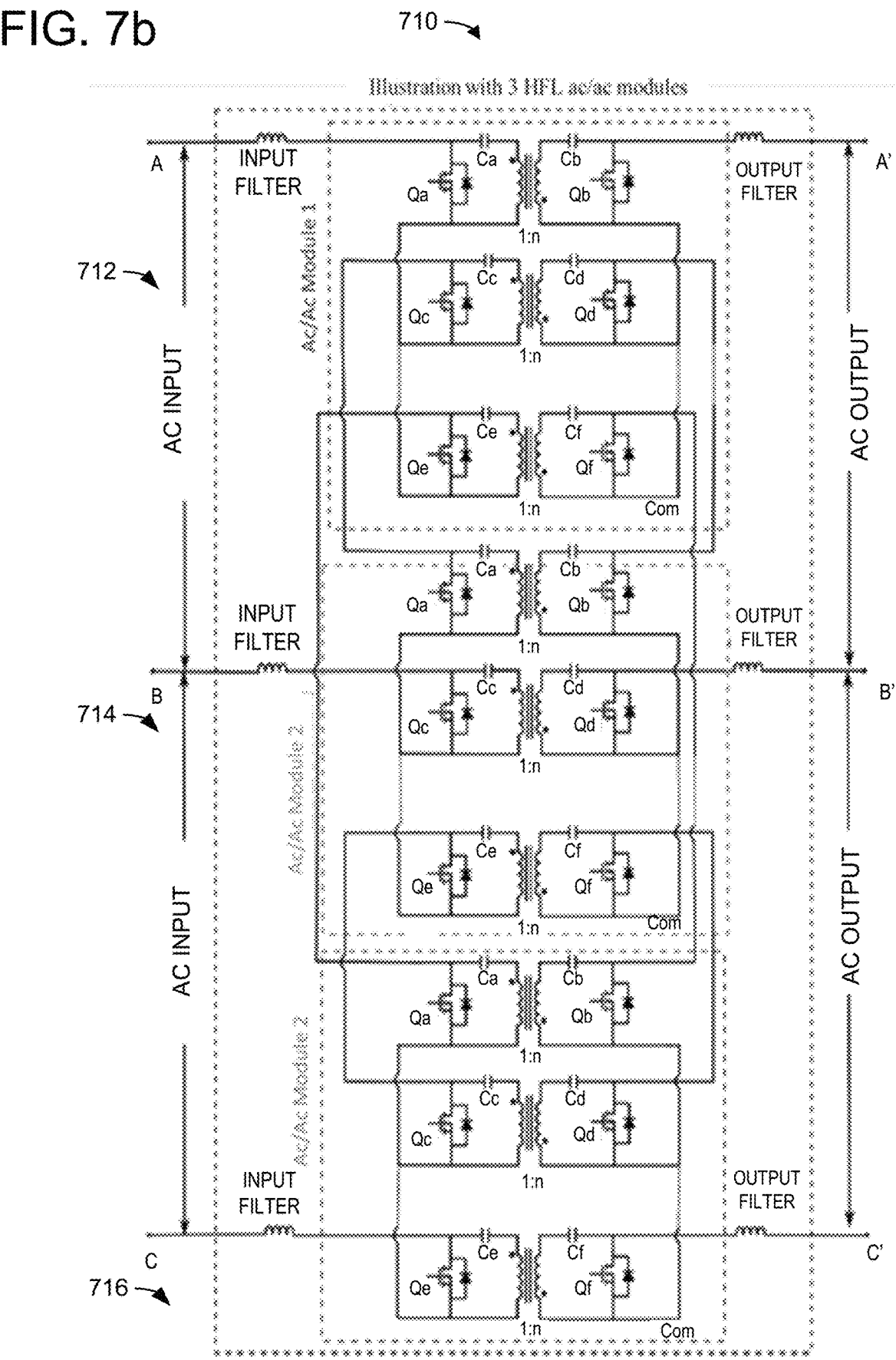
FIG. 7b illustrates a schematic for a voltage scaling system with N three-phase ac/ac modules according to some embodiments where N=3.

Other aspects of the invention may include a variation of voltage scaling. Referring now to FIG. 7a may include a system 700 having a generalized approach where an entire N-phase system is cascaded according to some embodiments. In one embodiment of such an approach for N=3 (i.e., a three-phase system) is illustrated in FIG. 7a for n three-phase ac/ac modules, such as 702, 704 and 706. FIG. 7b illustrates a schematic of a system 710 that builds on the system 700 of FIG. 7a with a more detailed illustration for n=3 shown in FIG. 7b, such as 712, 714, and 716. In one embodiment, the system 710 may demonstrate the ability for scaling for additional N-phase systems as well.

In another embodiment, the current scaling approach may be done by a plurality of options including paralleling multiple switches in a block and/or paralleling multiple blocks and/or multiple ac/ac modules in parallel and/or paralleling the entire ac/ac system. Additional variations on these approaches following some of the FIG. 4 approaches are also feasible.

In some aspects of the invention, controls and protections aspect of the power-electronic system may be further described below. For example, while the switching (or modulation scheme is discussed earlier), these switching may enable different output in response to controls and performance objectives desired out of the power system. In one embodiment, the mechanism for control may be based on proportional resonant and/or harmonic compensators (PRCs) with transformation to alleviate the impact of non-linear gain.

Figure 8A:
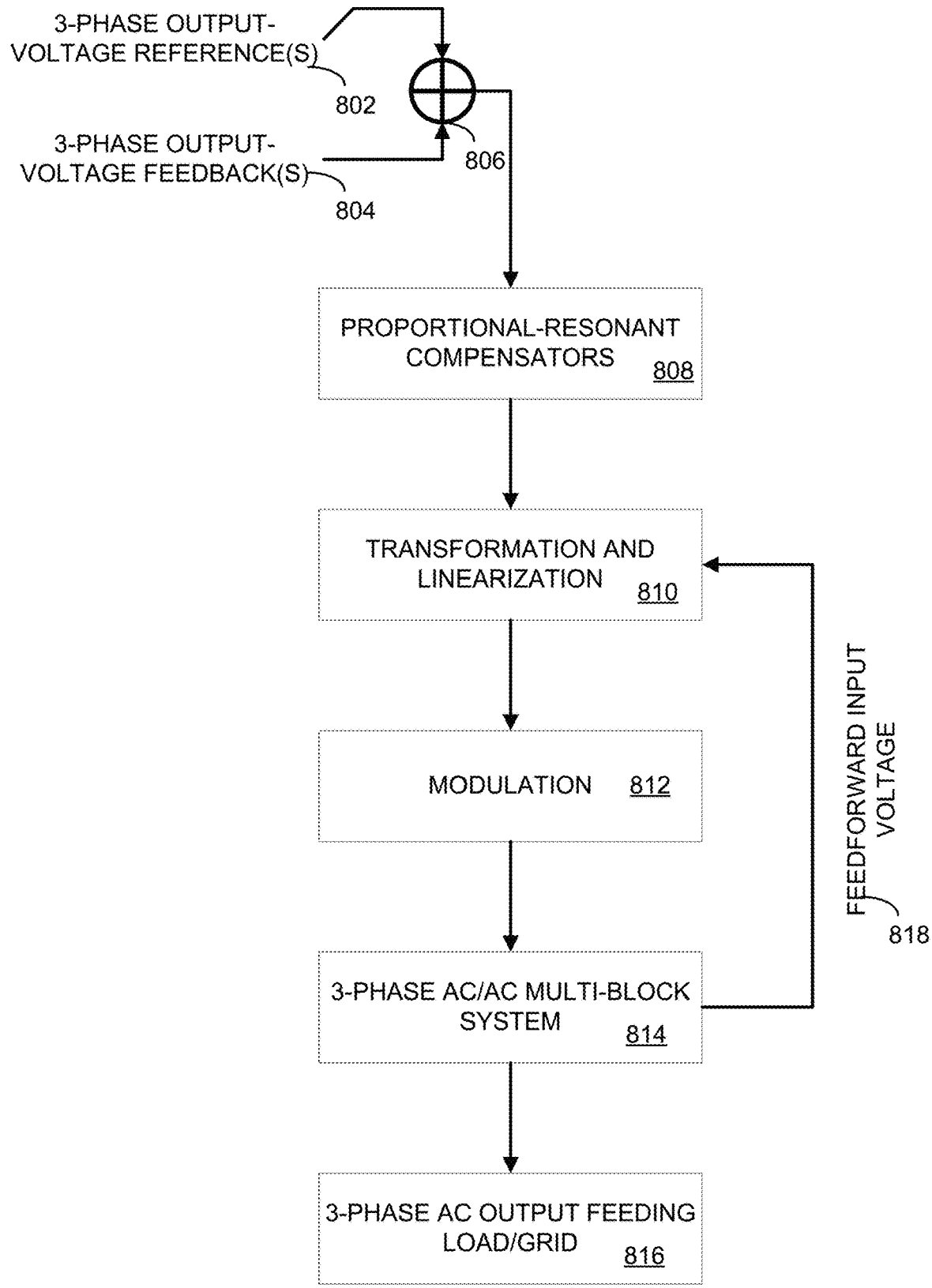
FIG. 8a illustrates a diagram for controlling a single-phase system in response to a N-phase system according to some embodiments.

One such embodiment is a diagram shown in FIG. 8a for a N-phase system with N=3, where the three-phase load may be a load or the output of the ac/ac converter system. The modulation scheme may be linear, nonlinear, or hybrid. For example, at 802, 3-phase output-voltage reference(s) and at 804, 3-phase output-voltage feedback(s) are provided as a load at 806.

Figure 8B:
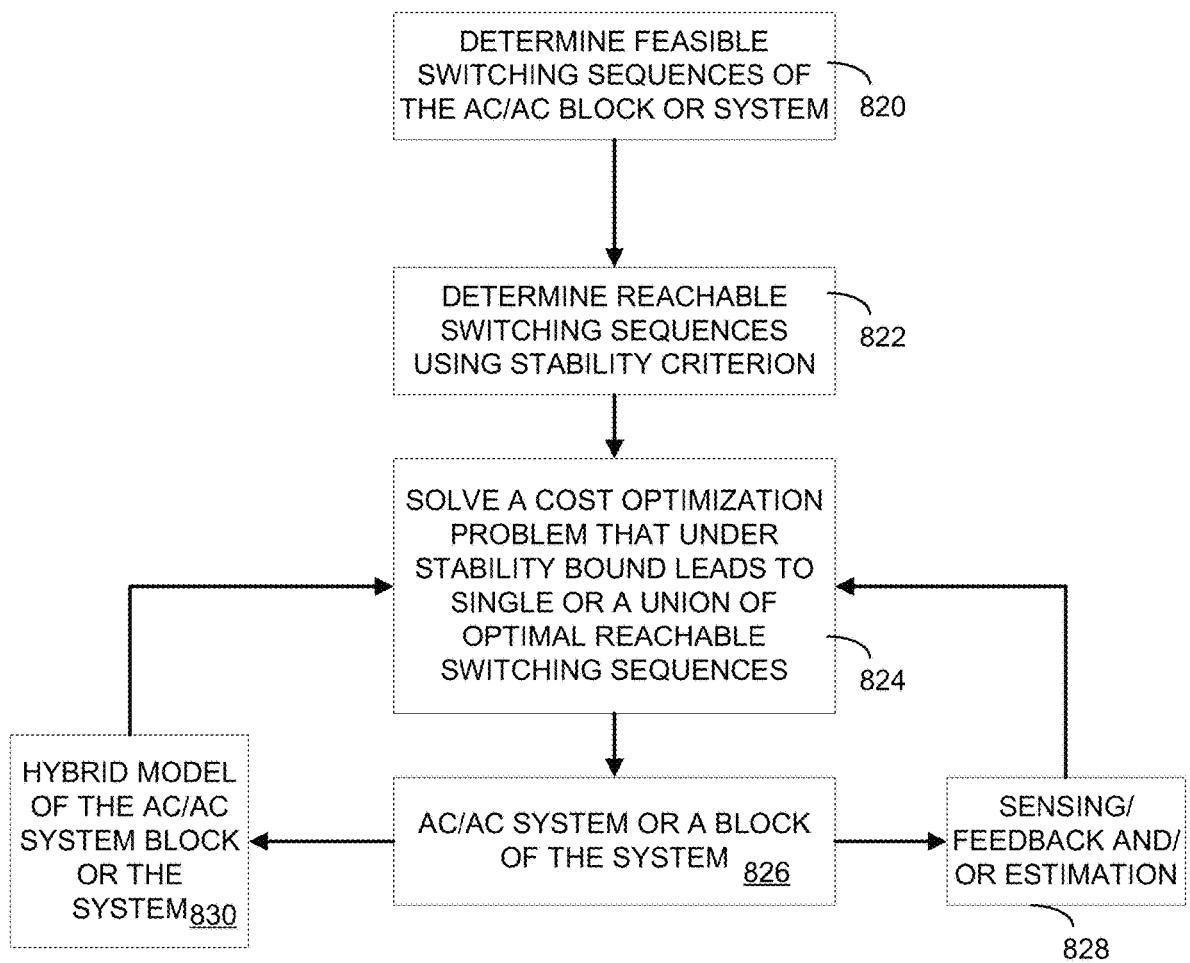
FIG. 8b illustrates a diagram for controlling a single-phase system based on an optimal control of switching states according to some embodiments.

In accordance with other embodiments, yet another approach may be based on an optimal control of the system switching states. FIG. 8b may include a flow chart for controlling a single-phase system in response to a N-phase system according to some embodiments. In one embodiment, at 820, it is determined whether feasible switching sequences of the ac/ac block or system. Switching sequence is time evolution of switching states. Essentially, each switch turns on (say a binary state of 1) or off (say a binary state of 0) (so there are typically binary states if one ignores the transition time which is quite small). A switching sequence could be 0 followed by 1 or 1 followed by 0 or 0 followed by 1 followed 0 etc. A feasible switching sequence is a subset of all possible switching sequences for a power converter.

At 824, it is further determined whether reachable switching sequences using stability criterion. At 826, embodiments of the invention solve a cost optimization problem that under stability bound may lead to single or a union of optimal reachable switching sequences. In one embodiment, the switching sequence control may have 3 main elements: a predictive model, system constraints, and an optimization problem that translate to minimizing/maximizing a single or multi-objective cost function. In each time horizon, a switching sequence is chosen and the chosen sequence may minimize the cost function using the prediction of the model and within the allowable constraints. In another embodiment, a cost function may be to differentiate between desired voltage and actual voltage and/or power converter loss (that needs to be minimized).

Once it is solved, an optimal function may be switched to an ac/ac system or a block of system in accordance with the solved solution at 826. In another embodiment, the output may also provide to a sensor or a feedback loop or an estimation back to further fine-tune the cost optimization at 828. In a further embodiment, a hybrid model of the ac/ac system or block of the system may be switched at 830 before triggering the solution.

In one embodiment, aspects of the invention provide an optimal cost function that addresses the performance metrics (e.g., efficiency, total harmonic distortion, regulation, power control, electromagnetic interference noise) that need to be realized and then may minimize or maximize this cost function using a predictive model and under system constraints to generate the switching states and hence switching sequences. To reduce the computational overhead in real time, the switching sequences may also be synthesized offline under stability (and/or reachability constraints).

In yet another embodiment, an extension of the control from an ac/ac module level to plurality of ac/ac modules of a multi-phase system may include multiple pathways of realization ranging from hierarchical to distributed to pseudo-decentralized control with limited communication to realize local (ac/ac module) and global (overall multi-ac/ac-module system) control objectives. In one example, to differentiate local and global control objectives, one may implement an actual global controller which may coordinate with multiples local controllers that command the power converters. Alternately, each controller may have a local controller while the global controller may be distributed among the local controllers and coordinated on a cyber layer thereby needing a dedicated global controller. Local control objectives has been alluded to above. In another embodiment, the local or global controller may be in the form of a physical hardware device dedicated for the control parameters. In another embodiment, the functions of the local or global controller may be implemented by software or programs.

In another embodiment, global control objectives may have plurality of objectives including but not limited to load sharing, voltage sharing, interleaving etc., to name a few. For communication-based coordination, aside from protocol-based communication, and communication mechanism may also be based on information compression, coding, event-/self-triggering, etc., to reduce the rate of data and information exchange among the ac/ac modules.

In one embodiment, FIG. 8a may illustrate a linear control scheme for a N-phase system with N=3. In another embodiment, the FIG. 8b may be an optimal and/or nonlinear control scheme for the ac/ac system or its block. In another embodiment, the control scheme is configured to receive input or instructions from a user. For example, the user may provide the instructions as programming codes. As such, switch controls for the control scheme may receive these codes or instructions from the users and the switch controls may process these instructions accordingly. In one embodiment, the switch controls may include a graphical user interface (GUI) that may be designed to receive parameters or data from the control schemes shown in FIGS. 8a and 8b so that a user may control or select effectuate the control schemes. In another embodiment, the parameters from the control schemes in FIGS. 8a and 8b may further be configured as inputs to application programming interface (API) so that other programs or software may interface the control schemes to enable easy manipulations of the controls. In a further aspect, the parameters or controls may be in the form of digital control modules, units, or devices. In another embodiment, the controls may be analog devices. In another embodiment, the controls may be a combination of digital and analog devices. In yet another embodiment, the control devices may further include wireless capabilities to transmit or receive the parameters or data thereof via wireless signals.

Figure 9A:
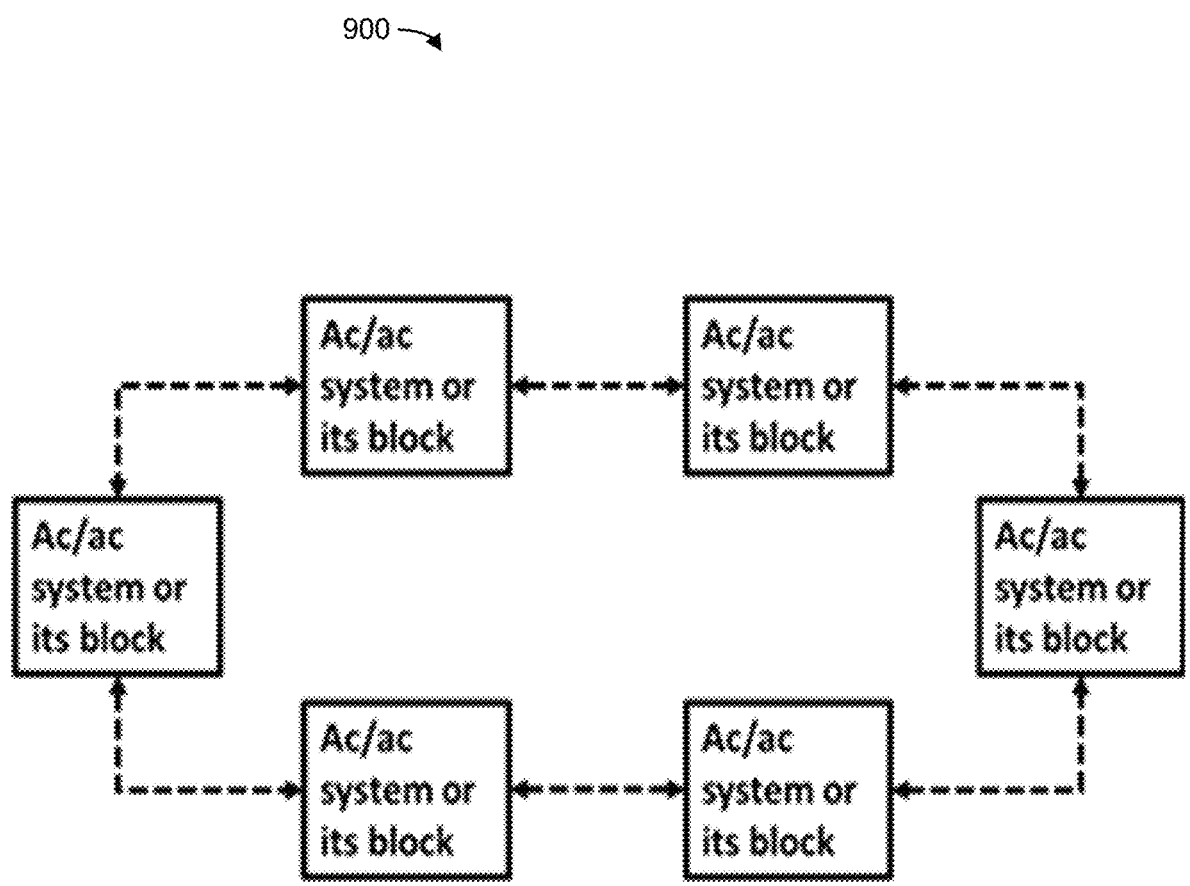
FIG. 9a illustrates a diagram for a ring architecture of control of a phase-based ac/ac according to some embodiments.
Figure 9B:
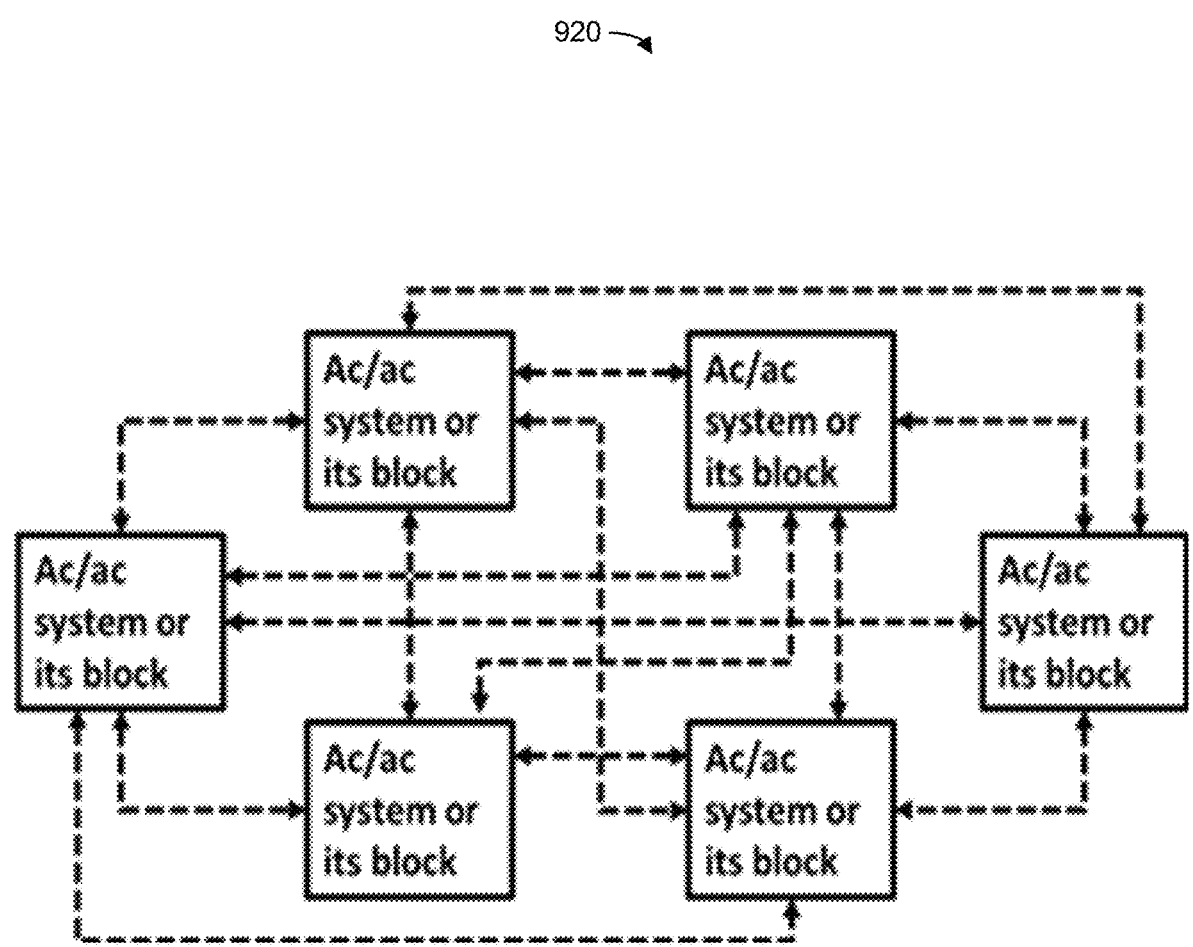
FIG. 9b illustrates a diagram for a mesh architecture of control of a phase-based ac/ac according to some embodiments.

Referring now to FIGS. 9a and 9b, a ring architecture 900 and a mesh architecture 920 are illustrated as two of such embodiments. Modular extension of the control approach from a single ac/ac N-phase system to m-module N-phase ac/ac system is achieved using networking where the network architecture and (wired/wireless) communication protocol may be one arbitrary type. For instance, and as illustrated in FIGS. 9a and 9b, the mesh 920 and ring 900 architectures are illustrated as two of such embodiments. The modular system may have the ability to achieve fault tolerance and/or self-healing for scenario when communication breakdown occurs or even ability to operate without communication or using event-triggered communication. Another control aspect of the invention may relate to the protection of the ac/ac standalone and multi-module system for plurality of phases and modules. In another embodiment, the protection may include three separate elements: protection against faults on the input and output ac sides, protection of the ac/ac converter system, and a coordination among these two sets of protections. Aspects of the invention improve over the coordination part by leveraging the high-speed protection capability of the ac/ac power-electronic system to reduce stress, cost, and enhanced reliability of the input and output ac side protections. In one embodiment, the protection may be configured where the solid state ac/ac power conversion system may be fed by an ac input and output an ac output with a power converter right in the middle to enable this. A fault may occur on the input and/or the output ac side(s). For example, line to ground fault or line to line fault, etc. A fault may also happen in the ac/ac converter itself. In either case, rapid action including fast coordination may be considered so that the impact of the fault is quickly mitigated.

Figure 10:
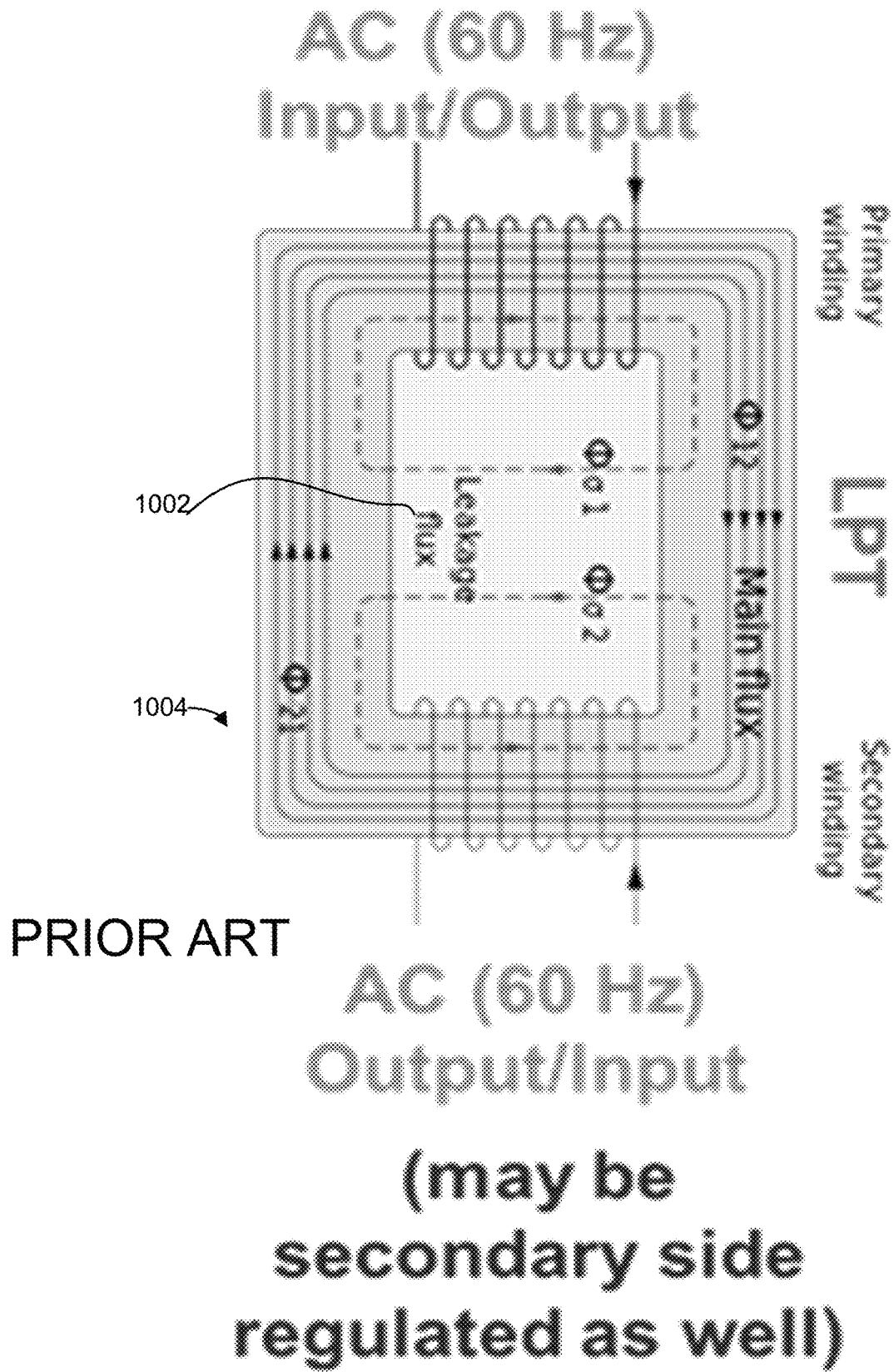
FIG. 10 illustrates a schematic of a conventional LPT according to prior art.

Comparison of the Proposed Innovation with Other Solid-State-Transformer (SST) Technologies FIG. 10 may include an illustration of a conventional LPT. In this example, the LPT includes a 60-Hz flux cycle. In one aspect, the illustration of flux cycle may be a 50 Hz in conventional LPTs. A conventional 60/50 Hz cycle-based LPT has no active semiconductor devices. Because flux cycle 1002 of the transformer is real low (e.g., a typical low frequency 60/50 Hz LPT has a low flux cycle compared to the solid state transformer which switches on the order of 20,000 if not higher), the size and weight of the LPT is significantly high. Conventional low-frequency LPTs have limited flexibility, modularity, and scalability. It is noted that, in some cases, a secondary side 1004 of a conventional 60/50-Hz cycle LPT may be modified with secondary-side power-electronic tap changing regulators. However, even such a LPT has large size and heavy weight since the flux cycle is still low.

Figure 11A:
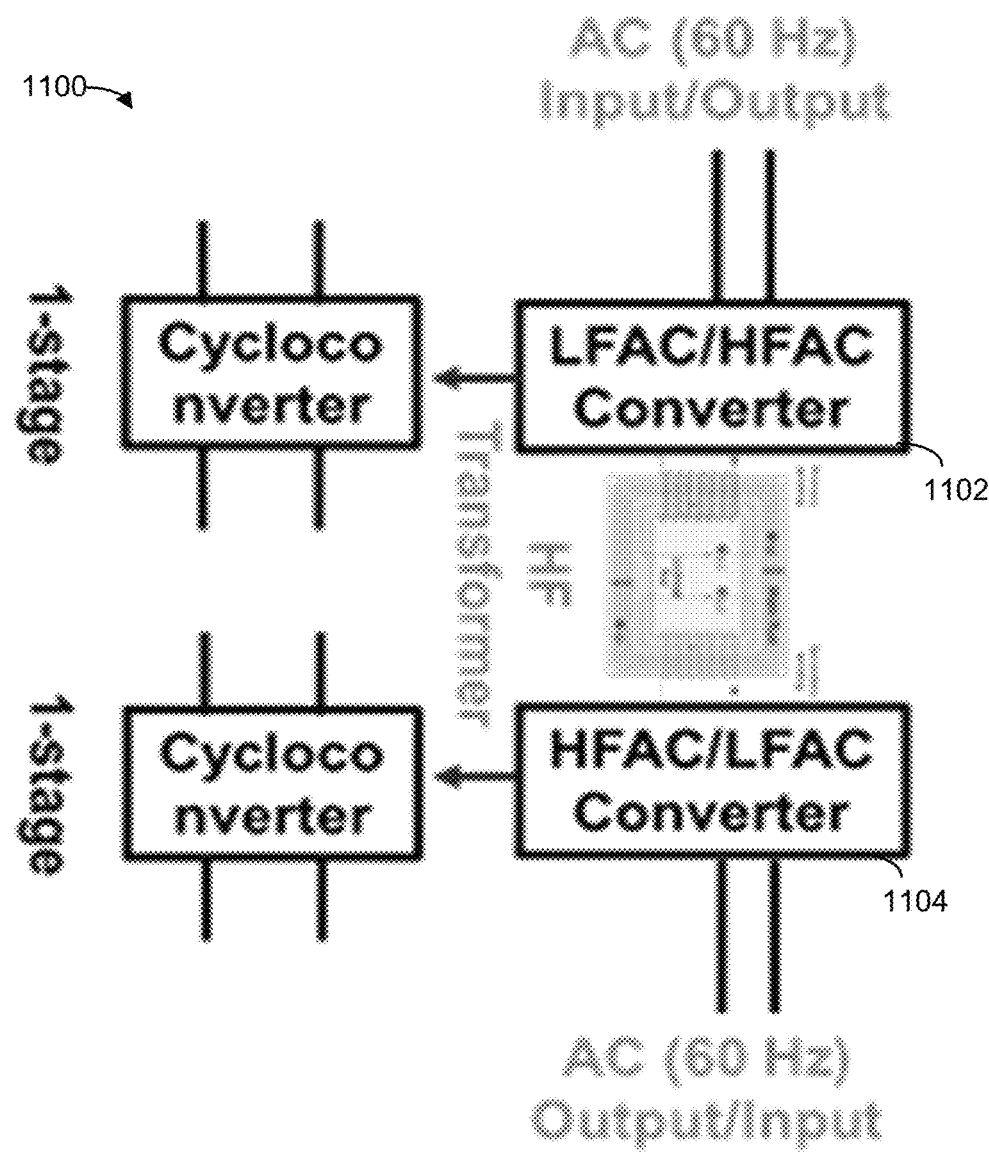
FIG. 11a illustrates a diagram for a high-frequency-based solid-state transformer (SST) system having a set of power-electronic converter according to some embodiments.
Figure 11B:
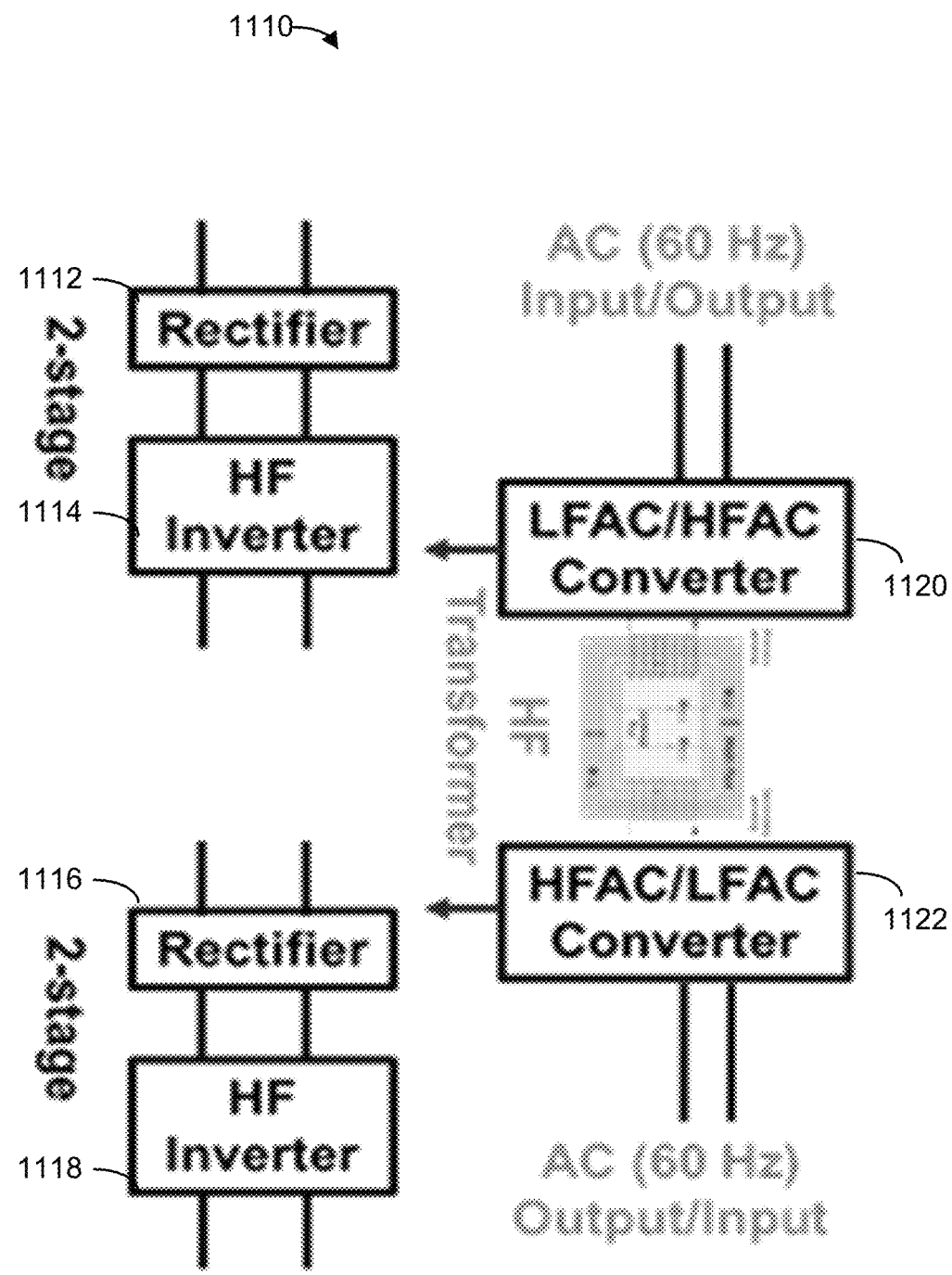
FIG. 11b illustrates a diagram for a high-frequency-based solid-state transformer (SST) system having a set of power-electronic converter according to some embodiments.

The weight and size reduction of a 50/60 Hz cycle LPT is reduced by increasing the frequency of the LPT flux cycle to yield a high-frequency-based solid-state transformer (SST). However, to obtain such high frequency in a SST, a set of power-electronic converter, as illustrated in FIGS. 11a and 11b, may be needed at the input side and at the output side of a high-frequency (HF) transformer. There are different ways to achieve this.

According to aspects of the invention, according to FIG. 13a, a front-end power-electronic converter 1100 may be a low-frequency-ac-to-high-frequency-ac single-stage (LFAC/HFAC) converter 1102, which may also be referred to as a cycloconverter. Similarly, at the output, one may use a high-frequency-ac-to-low-frequency-ac single-stage (HFAC/LFAC) converter 1104, which may also be a single-stage cycloconverter.

In one embodiment, aspects of the invention may include two cycloconverter stages with the HF transformer sandwiched in between. However, to support cycloconversion, four-quadrant high-frequency semiconductor devices may be needed, which are not available in existing configuration of the prior art. Therefore, embodiments of the invention may include a plurality of available of high-frequency devices to achieve the same realization.

In yet another approach, and as illustrated in FIG. 13b, another diagram may illustrate a SST system to mitigate the need for four-quadrant devices according to some embodiments. In one example, a front-end of the HF transformer 1120 (e.g., the LFAC/HFAC) may be part of a two-stage power-electronic system 1110 comprising an ac/dc rectifier 1112 followed by a dc/ac HF inverter 1114; while an output end of the HF transformer 1122 (e.g., the HFAC/LFAC) comprises a rectifier 1116 followed by a dc/ac HF inverter 1118. Such an aspect of the invention, therefore, may provide four stages of power conversion while eliminating the need for four-quadrant devices.

In contrast, aspects of the invention, such as one embodiment as shown in FIG. 4a, provide a single stage approach with a modular, flexible, and scalable power-conversion system that provides ease of manufacture. Such an approach may reduce the number of devices, semiconductor device cost, and the complexity of the system for a comparable conventional SST. Compared to 60/50-Hz flux cycle LPT, embodiments of the invention may reduce the size and weight of the transformer significantly. Embodiments of the invention may also reduce the need for electromagnetic-interference (EMI) filtering since it yields input and output current continuity. In one example, FIG. 4a's La1 and La2 in block 402 preceded and followed by Ca1 and Ca4 yield reduced source and load current ripples due to input-output continuity. This configuration may mitigate the need for an electromagnet interference (EMI) filter. In contrast and as an example, a buck converter in contrast will have a pulsating input current which will require a larger EMI filter.

In another embodiment, as shown in FIG. 4b where the input and output current ripple may be reduced even further due to integration of the inductors and the single-phase system yields reduced current ripples. This has a profound effect on reducing the need for an EMI filter.

Additionally, aspects of the invention, based on its inductive and capacitive variant, may provide a dual capability of stepping up and stepping down of the voltage. In this example, this approach creates a symmetry of the topology while providing the ability to reduce the size of the high-frequency-based ac/ac system via magnetic integration.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of embodiments may become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it may be understood by those of ordinary skill in the art having the present specification, figures and claims before them, that the corresponding structure includes a computer, processor, or microprocessor (as the case may be) programmed to perform the particularly recited function using functionality found in a computer after special programming and/or by implementing one or more algorithms to achieve the recited functionality as recited in the claims or steps described above. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one embodiments to the embodiments illustrated.

Further advantages and modifications of the above-described system and method may readily occur to those skilled in the art.

The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

What is claimed is:

1. A solid-state power-conversion system comprising:
   a single-stage first block comprising at a first input side:
      at least one first input switch;
      at least one first input inductor, and
      at least one first input capacitor;
   and
   at a first output side:
      at least one first output switch;
      at least one first output inductor, and
      at least one first output capacitor; and
   a first high-frequency transformer (HFT);
   a single-stage second block comprising at a second input side:
      at least one second input switch;
      at least one second input inductor, and
      at least one second input capacitor;
   and
   at a second output side:
      at least one second output switch;
      at least one second output inductor, and
      at least one second output capacitor; and
   a second HFT; and
   wherein the second block and first block are connected in series at input and output sides.

2. The solid-state power-conversion system of claim 1, wherein the first input inductor, the first output inductor, and the first HFT form a common magnetic core.

3. The solid-state power-conversion system of claim 1, wherein fluxes of the at least one first input inductor and the at least one first output inductor are built up in response to the at least one first input switch being energized, or wherein fluxes of the at least one second input inductor and the at least one second output inductor are built up in response to the at least one second input switch being energized.

4. The solid-state power-conversion system of claim 1, wherein energies of the at least one first input inductor and the at least one first output inductor are transferred to the at least one first input capacitor and the at least one first output capacitor in response to the at least one first output switch being energized or wherein energies of the at least one second input inductor and the at least one second output inductor are transferred to the at least one second input capacitor and the at least one second output capacitor in response to the at least one second output switch being energized.

5. The solid-state power-conversion system of claim 1, further comprising at least one loss-mitigating soft switching circuit, wherein the at least one soft switching circuit comprises at least a switch, a capacitor, and an inductor.

6. The solid-state power-conversion system of claim 1, further comprising a switch control for the first block or the second block to provide switching states and switching sequences for switches of each of the first block and the second block, wherein the switch control for the first block or the second block is configured to coordinate the switching states and the sequences of the switch states for each of the first block and the second block.

7. The solid-state power-conversion system of claim 6, wherein the switch control for the first block and the switch control for the second block are configured to coordinate with each other.

8. The solid-state power-conversion system of claim 1, further comprising a third block comprising at a third input side:
  at least one third input switch;
  at least one third input inductor, and
  at least one third input capacitor;
  and
  at a third output side:
  at least one third output switch;
  at least one third output inductor, and
  at least one third output capacitor;
  a third HFT;
  wherein the first block, the second block, and the third block are connected in series at input and output sides.

9. A solid-state power-conversion system having at least two alternating current (ac) to ac (ac/ac) modules comprising:
  at least two single-phase blocks in each of the at least two ac/ac modules, each of the two single-phase blocks comprises at a first input side:
    at least one first input switch; and
    at least one first input capacitor;
    and
  at a first output side:
    at least one first output switch; and
    at least one first output capacitor; and
    a high frequency transformer (HFT);
  wherein each of the two single-phase modules is connected in series at the input and the output to each other.

10. The solid-state power-conversion system of claim 9, further comprising at least an input inductor outside at least one of the at least two ac/ac modules.

11. The solid-state power-conversion system of claim 9, further comprising at least an output inductor outside at least one of the at least two ac/ac modules.

12. The solid-state power-conversion system of claim 9, further comprising a switch control for each of the two single-phase blocks to provide switching states and switching sequences of the switching states for each of the blocks, wherein the switch control is configured to coordinate the switching states and the sequences of the switching states for each of the blocks.

13. The solid-state power-conversion system of claim 12, wherein the switch control for each of the two single-phase blocks in the two ac/ac modules are configured to coordinate with the switch control in the modules.

14. The solid-state power-conversion system of claim 9, further comprising at least one loss-mitigating soft switching circuit, wherein the soft switching circuit comprises at least a switch, a capacitor, and an inductor.

15. The solid-state power-conversion system of claim 9, wherein fluxes of the at least one first input inductor and the at least one first output inductor are built up in response to the at least one first input switch being energized.

16. The solid-state power-conversion system of claim 9, wherein energies of the at least one first input inductor and the at least one first output inductor are transferred to the at least one first input capacitor and the at least one first output capacitor in response to the at least one first output switch being energized.

17. A three-phase solid-state power-conversion system comprising:
  at least three blocks in at least one alternating current (ac) to ac (ac/ac) module, each of the three blocks comprises
    at an input side:
    at least one input switch;
    at least one input inductor, and
    at least one input capacitor;
    and
    at an output side:
    at least one output switch;
    at least one output inductor, and
    at least one output capacitor; and
    a high-frequency transformer (HFT); and
  wherein the each of the three blocks is connected in series at the input and the output to each other.

18. The solid-state power-conversion system of claim 17, further comprising a switch control for each of the three single-phase blocks to provide switching states and switching sequences for a switch of each of the blocks, wherein the switch control is configured to coordinate the switching states and the sequences of the switching states for each of the blocks.

19. The solid-state power-conversion system of claim 17, wherein the switch control for each of the three single-phase blocks in the at least one ac/ac module is configured to coordinate with the switch control in the at least one module.

20. The solid-state power-conversion system of claim 17, further comprising at least one loss-mitigating soft switching circuit, wherein the soft switching circuit comprises at least a switch, a capacitor, and an inductor.

* * * * *